UNITED STATES PATENT OFFICE.

TRAUGOTT SANDMEYER, OF BASLE, SWITZERLAND, ASSIGNOR TO JOHN R. GEIGY & CO., OF SAME PLACE.

BLUE DYE.

SPECIFICATION forming part of Letters Patent No. 538,215, dated April 23, 1895.

Application filed July 25, 1892. Serial No. 441,198. (Specimens.)

*To all whom it may concern:*

Be it known that I, TRAUGOTT SANDMEYER, a citizen of the Swiss Republic, residing at Basle, Switzerland, have invented certain new and useful Improvements in the Manufacture of a Blue Dye-Stuff or Coloring-Matter, of which the following is a specification.

This invention relates to a blue dye-stuff or coloring matter, which is produced from the monosulfoacid of diphenylamin (*Beilstein Handbook of Organic Chemistry*, edition of 1883, page 963) by condensing two molecules of the same with one molecule of formaldehyde in acid solution to the disulfoacid of diphenyl-diamidodiphenylmethan and oxidizing the said derivative in combination with a further molecule of diphenylamin monosulfoacid to the symmetrical bisulfoacid of triphenyl-pararosanilin.

In carrying out my invention I dissolve 8.1 kilograms (three molecules) of dry sodium salt of diphenylamin monosulfoacid in one hundred liters of water and add to this solution ten liters of hydrochloric acid and 0.75 kilograms (one molecule) of a solution containing forty per cent. of formaldehyde. Then I heat the mixture in a boiler with reflux cooler at a temperature of 100° to 105° centigrade during about half an hour, until the combination (or the so-called condensation) of two molecules of diphenylamin monosulfoacid with the molecule of formaldehyde has been accomplished. A mixture of sixteen kilograms of a solution of chlorid of iron, containing forty-seven per cent. $Fe_2Cl_6$ and one hundred liters of water are then gradually and under constant stirring added to the above boiling solution. The oxidation being accomplished the coloring matter crystallizes in small needles exhibiting a bronze-like luster and dissolving in water with a bright blue color. The crystals are filtered, washed and dissolved in an aqueous solution of carbonate of sodium in order to remove every trace of iron, and precipitated from the filtered nearly colorless alkaline solution by means of hydrochloric acid.

This crystallized blue is the sodium salt of the symmetrical bisulfoacid of triphenyl-pararosanilin and differs from the ordinary rosanilin blues, which are mixtures of various coloring matters and have hitherto been known in commerce only under the appearance of amorphous powders or lumps, principally by its crystallized condition and by its uniformity of composition and by its pure blue shade.

The process above described differs essentially from the one mentioned by Edward Vongerichten in Patent No. 471,659, dated March 29, 1892, as the sulfoacid of diphenylamin is employed instead of diphenylamin, and the formation of the coloring matter obtained in an aqueous solution and at a low temperature instead of melting it at a high temperature, by which means a dye is produced that is perfectly soluble in water, while the coloring matter obtained by Vongerichten is on the contrary insoluble in water.

The new blue dye-stuff has the following constitutional formula:

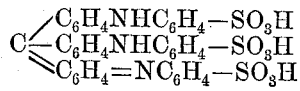

and the following characteristics: it is nearly insoluble in cold water, easier in hot water, while the sodium-salt of the trisulfoacid dissolves very easily in cold water with a pale blue shade. By addition of alkali, the solution becomes almost colorless, but the color returns when an acid is added. In concentrated sulfuric acid the dye-stuff dissolves with a reddish brown shade, but on diluting this solution with water, the coloring matter is separated immediately in blue flocks. The solution of the trisulfoacid in concentrated alkali-lye and ammonia shows a brown shade. In alcohol and ether it is insoluble. It crystallizes in microscopic needles of bronze-like luster and differs therefore distinctly from all other rosanilin blues.

What I claim is—

1. The process herein described of making a blue dye-stuff which consists in the condensation of two molecules of monosulfoacid of diphenylamin with one molecule of formaldehyde in acid solution to the disulfoacid of diphenyldiamidodiphenylmethan, and in the oxidation of the said derivative in combination with a further molecule of diphenylaminmonosulfoacid to the symmetrical trisulfoacid of triphenylpararosanilin.

2. The blue dye-stuff hereinbefore described, being the sodium-salt of the symmetrical trisulfoacid of triphenylrosanilin and having the following characteristics: it dissolves in concentrated sulfuric acid with a reddish brown shade, and separates in blue flocks when the solution is diluted with water, it dissolves easily in cold water with a pale blue shade, becomes almost colorless by adding alkali, but regains its color when an acid is added; its trisulfoacid dissolved in concentrated alkali-lye and ammonia shows a brown shade, is insoluble in alcohol and ether, and crystallizes in minute needles of bronze-like luster, substantially as set forth.

In testimony whereof I hereunto sign my name, in the presence of two subscribing witnesses, this 8th day of July, 1892.

TRAUGOTT SANDMEYER.

Witnesses:
GEORGE GIFFORD,
CLARENCE GIFFORD.